United States Patent
Varadarajan et al.

[11] Patent Number: 5,886,132
[45] Date of Patent: Mar. 23, 1999

[54] METHOD FOR CONTROLLING THE EFFECTIVE LEVEL OF CATALYST DURING THE PREPARATION OF A POLYCARBONATE POLYMER BY TRANSESTERIFICATION

[75] Inventors: Godavarthi Satyanarayana Varadarajan, Niskayuna, N.Y.; Tomoaki Shimoda, Moka, Japan; Akio Kanezawa, Sodegaura, Japan; Satoru Minami, Ichihara, Japan

[73] Assignee: General Electric Company, Schenectady, N.Y.

[21] Appl. No.: 777,726

[22] Filed: Dec. 20, 1996

[51] Int. Cl.[6] .................................................. C08G 64/00
[52] U.S. Cl. .......................... 528/196; 502/300; 502/344; 526/59; 528/198
[58] Field of Search .................... 502/300, 344; 526/59; 528/196, 198

[56] References Cited

U.S. PATENT DOCUMENTS

| | | | |
|---|---|---|---|
| 4,619,901 | 10/1986 | Webb et al. | 436/55 |
| 4,956,426 | 9/1990 | Ardell et al. | 526/60 |
| 5,116,915 | 5/1992 | Mamedov | 526/60 |

*Primary Examiner*—Terressa Mosley
*Attorney, Agent, or Firm*—Ernest G. Cusick; Noreen C. Johnson

[57] ABSTRACT

A method for determining the effective level of catalyst for the preparation of a polycarbonate polymer by a transesterification reaction is disclosed. The method involves measurement of the leaving group by-product (usually phenol) produced in a test reaction between an aromatic dihydroxy compound and a carbonic acid diester, in the presence of a known amount of transesterification catalyst. The by-product production values can be compared with by-product reference values to calculate the effective level of catalyst. This data can be used to efficiently control catalytic activity in a production scale reaction for producing polycarbonate polymer.

22 Claims, 1 Drawing Sheet

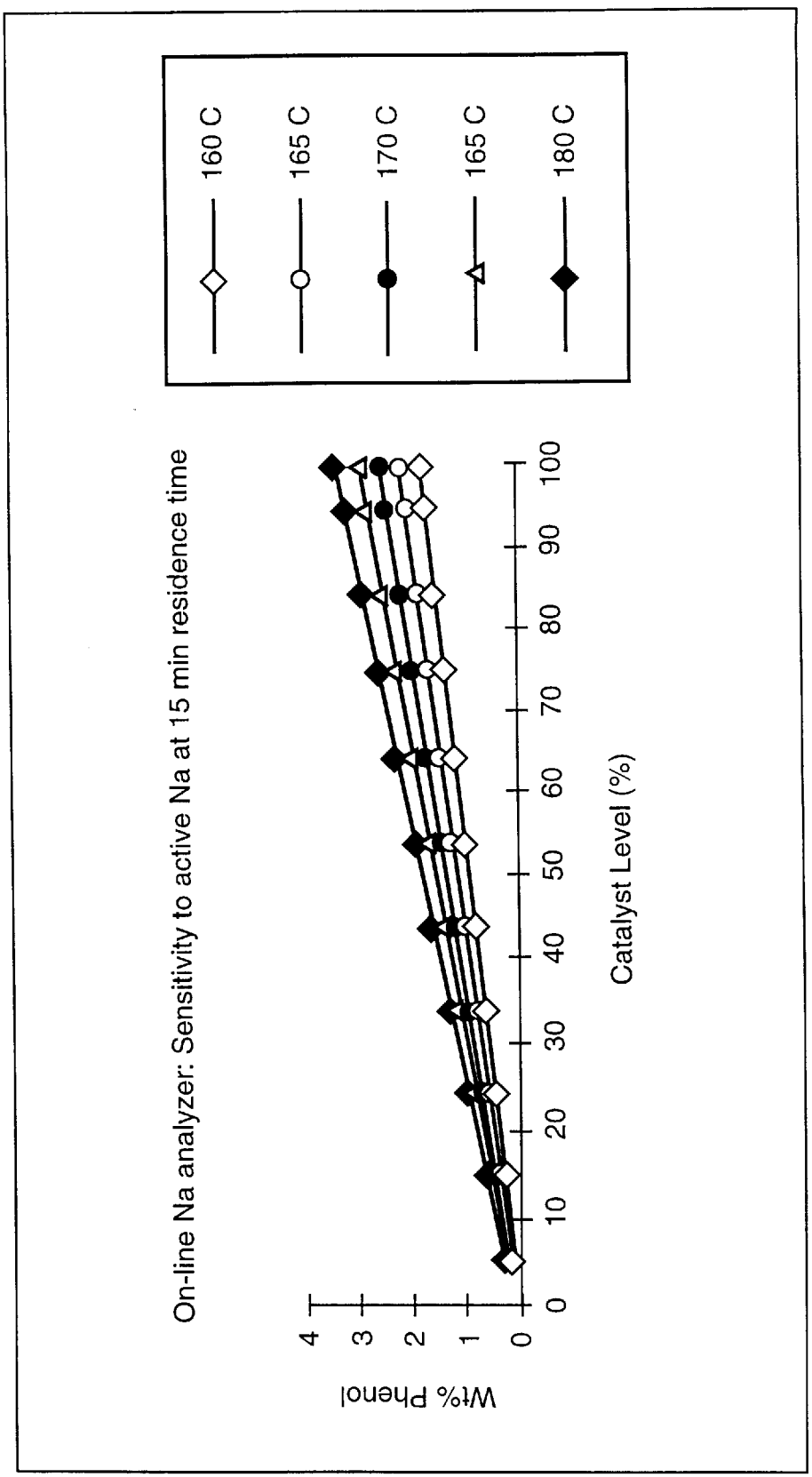

METHOD FOR CONTROLLING THE EFFECTIVE LEVEL OF CATALYST DURING THE PREPARATION OF A POLYCARBONATE POLYMER BY TRANSESTERIFICATION

TECHNICAL FIELD

This invention relates generally to polymer processes, and ore particularly, to industrial processes used to prepare polycarbonates.

BACKGROUND OF THE INVENTION

Polycarbonates are widely used polymers. Their popularity stems from an attractive set of mechanical and physical properties, such as impact resistance, heat resistance, and transparency. They can be made by a variety of techniques, such as direct phosgenation and ester interchange, which is often referred to as transesterification. Direct phosgenation can be carried out by an interfacial technique, which involves the reaction of an aromatic dihydroxy compound such as bisphenol A with phosgene.

The transesterification process has some definite advantages over direct phosgenation. First, it does not rely on the use of phosgene, a material which is toxic and somewhat difficult to handle. Moreover, transesterification usually does not result in the excessive generation of chloride ions, which sometimes occurs in phosgenation processes.

Transesterification involves reaction between an aromatic dihydroxy compound and a carbonic acid diester. It is usually carried out in the molten state, wherein a polycondensation reaction results in the production of the product polymer. Batch reactors may be used, but when large volumes are involved, continuous processes are usually employed. These processes often include one or more continuous-flow stirred-tank reactors (CSTR's), where oligomers of a low molecular weight and viscosity are made, followed by one or more finishing reactors, which convert the oligomers into high molecular weight polymer. The reaction requires at least one catalyst. Sometimes, a combination of catalysts is used, such as an alkali metal or alkaline earth metal compound, along with a quaternary ammonium compound.

Precise control of the catalyst level is often critical in the preparation of polycarbonates. This is especially true in the case of the alkali metal or alkaline earth metal catalysts, which are sometimes employed at the parts-per-billion to parts-per-million level. In practice, control of the "effective amount" of catalyst is actually the critical task, i.e., control of the amount which actually catalyzes the transesterification reaction, without consideration of the remainder of the catalyst. The remainder of the catalyst may be participating in a multitude of side reactions. For example, it may be neutralizing impurities or being quenched in some other way. Moreover, the impurities themselves could be catalyzing the primary transesterification reaction, e.g., if their net concentration is chemically basic. The impurities may inadvertently enter the reaction system by a wide variety of routes. For example, they may originate with the aromatic dihydroxy compound, or the carbonic acid diester. They may also leach into the reactor through numerous routes.

If too much "effective" catalyst is present in a continuous polymerization process, some serious problems may occur. For example, the molecular weight of the product may be excessive, and the product can exhibit increased yellowing. Moreover, undesirable side reactions may take place. Furthermore, residual catalyst which remains in the polymer product may cause the product to exhibit decreased hydrolytic stability.

At the other end of the spectrum, too low a level of effective catalyst can also present problems. The most serious consequence is a low molecular weight product which will not possess the mechanical properties required for many commercial applications.

Those of skill in the polymer arts—especially those who work with polycarbonates—must therefore acknowledge that a very accurate method for controlling the level of effective catalyst in a transesterification process would be a welcome advancement. The method should be completely compatible with the primary reaction being carried out to prepare the polymer. Moreover, the method should not require any costly additions to the overall process—in terms of both equipment and processing time. Finally, the polymer product resulting from catalyst adjustment according to this invention should possess a set of desirable physical and mechanical properties which one typically expects from polycarbonates.

SUMMARY OF THE INVENTION

The present invention satisfies the needs discussed above. One embodiment is directed to a method for determining the effective level of catalyst for the preparation of a polycarbonate polymer by a transesterification reaction between an aromatic dihydroxy compound and a carbonic acid diester which produces a leaving group by-product; comprising the following steps:

a) reacting trial portions of the aromatic dihydroxy compound and the carbonic acid diester at a temperature below the boiling point of the leaving group by-product, under melt conditions in the presence of a known amount of a transesterification catalyst;

b) measuring the level of by-product produced; and c) calculating the effective level of catalyst, based on the known amount of catalyst added in step (a); the difference between the by-product level measured in step (b) and a by-product reference value pre-determined from a calibration reaction between the aromatic dihydroxy compound and the carbonic acid diester; and the functional relationship between by-product production and catalyst concentration for the calibration reaction. Usually, the by-product being produced and measured is phenol, or a substituted phenolic compound.

Another embodiment of the invention is directed to a method for controlling the effective level of catalyst during the preparation of a polycarbonate polymer by a transesterification reaction between an aromatic dihydroxy compound and a carbonic acid diester which produces a leaving group by-product; comprising the following steps:

a) reacting trial portions of an aromatic dihydroxy compound and a carbonic acid diester at a temperature below the boiling point of the by-product, under melt conditions in the presence of a known amount of a transesterification catalyst;

b) measuring the level of by-product;

c) calculating the effective level of catalyst for the transesterification reaction, as described herein; and d) adjusting the amount of catalyst utilized in a production-scale transesterification reaction process to prepare polycarbonate, based on the effective level of catalyst determined in step (c). The adjustment can be based on a target value for catalyst level, determined by data and observations for previous transesterification reactions of the same type.

Improved methods for preparing polycarbonates based on these discoveries represent another embodiment of the claimed inventive concept.

Numerous other details regarding these embodiments are provided below.

BRIEF DESCRIPTION OF THE DRAWINGS

FIG. 1 is a graph depicting catalyst level as a function of the level of phenol, as described herein.

DETAILED DESCRIPTION OF THE INVENTION

In general, the details regarding transesterification to produce polycarbonates are well-known in the art and described, for example, in *Organic Polymer Chemists* by K. J. Saunders, 1973, Chapman and Hall Ltd., as well as in the following U.S. patents, all of which are incorporated herein by reference: U.S. Pat. Nos. 3,442,854; 5,026,817; 5,097,002; 5,142,018; 5,151,491; and 5,340,905. Thus, a comprehensive discussion regarding the overall process should not be necessary here. The melt polycondensation of aromatic dihydroxy compounds and carbonic acid diesters can be carried out by either a batch mode or a continuous mode. The apparatus in which the reaction is carried out can be any suitable type of tank, tube, or column. As mentioned previously, the continuous processes usually involve the use of one or more CSTR's and one or more finishing reactors.

As noted in many of the references listed above, a variety of aromatic dihydroxy compounds may be utilized. Examples include, bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy- 1-methylphenyl) propane; 1,1-bis(4-hydroxy-t-butylphenyl) propane; and 2,2-bis(4-hydroxy-3-bromophenyl)propane; bis (hydroxyaryl)cycloalkanes such as 1,1-(4-hydroxyphenyl) cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In most preferred embodiments, the aromatic dihydroxy compound is bisphenol A (BPA).

Examples of the carbonic acid diesters include diphenyl carbonate; ditolyl carbonate; bis(chlorophenyl)carbonate; m-cresyl carbonnate; dinaphthyl carbonate; bis(diphenyl) carbonate; diethyl carbonate; dimethyl carbonate; dibutyl carbonate; and dicyclohexyl carbonate. Diphenyl carbonate (DPC) is often preferred for polycarbonates being prepared on an industrial basis. As described in U.S. Pat. No. 5,026,817, the carbonic diester component may also contain a minor amount, e.g., up to about 50 mole %, and preferably, up to about 30 mole %, of a dicarboxylic acid or its ester, such as terephthalic acid or diphenyl isophthalate, to prepare polyesterpolycarbonates.

In preparing the polycarbonates, usually about 1.0 mole to about 1.30 moles of carbonic diester are utilized for every 1 mole of the aromatic dihydroxy compound. In preferred embodiments, about 1.01 moles to about 1.20 moles of the carbonic diester is utilized.

As mentioned above, the reaction requires at least one transesterification catalyst. Most often, the catalyst is derived from an alkali metal-based compound, or an alkaline earth metal. Examples of the alkali metal-based compounds are sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, sodium phenylate, potassium phenylate, lithium phenylate, sodium borohydride, potassium borohydride, and lithium borohydride. In practice, the alkali metal-based compound initially reacts in the melt with the aromatic dihydroxy compound to form an alkali metal salt. Thus, the active catalyst is actually an alkali metal salt of the aromatic dihydroxy compound, e.g., the sodium salt of bisphenol A. Moreover, salts of the dihydroxy compounds (prepared beforehand) may also be used, e.g., the disodium- , dipotassium- , or dilithium salts of bisphenol A.

Examples of the alkaline earth metal compounds are calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontiun carbonate, calcium acetate, barium acetate, magnesium acetate, strontium acetate, calcium stearate, barium stearate, magnesium stearate, and strontium stearate.

An example of an additional transesterification catalyst suitable for most processes is a quaternary ammonium compound or a quaternary phosphonium compound, such as those described in the previously-mentioned U.S. Pat. No. 5,340,905. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, and dimethyl diphenyl ammonium hydroxide.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In preferred embodiments, the level is in the range of about $1 \times 10^{-5}$ to about $5 \times 10^{-2}$ mole per mole of dihydroxy compound. Non-limiting examples of the use of catalysts at various levels during the preparation of polycarbonate are provided in the above-referenced U.S. Pat. No. 5,026,817. When more than one catalyst is employed, each may be incorporated into the melt at a different stage of the reaction.

U.S. Pat. Nos. 5,026,817 and 5,151,491 (also referenced above) provide many examples of variations in the transesterification process, all of which are in the broadest scope of the present invention. In general, the polycondensation reaction of the aromatic dihydroxy compound with the carbonic acid diester compound includes a first stage, carried out under ambient pressure at a temperature of from about 80° C. to about 250° C., for up to about 5 hours. In preferred embodiments, the temperature at this stage is in the range of about 130° C. to about 230° C., while in some especially preferred embodiments, is in the range of about 150° C. to about 190° C. Similarly, in preferred embodiments, the time period for this stage is preferably up to about 4 hours, while in especially preferred embodiments, is in the range of about 0.25 hours to about 3 hours. In the second stage, the reaction is continued while reducing the pressure and elevating the temperature, and is completed eventually under a reduced pressure of about 1 mm Hg (or lower), at a temperature in the range of about 240° C. to about 320° C.

One specific, non-limiting illustration of a suitable process is described in the Saunders text. A mixture of bisphenol A, diphenyl carbonate, and the primary catalyst can be melted and agitated at about 150° C. under nitrogen. The temperature is raised to about 210° C. over about 1 hour, and the pressure is then reduced to about 20 mm Hg. At this point, most of the phenol has been distilled off. The reaction mixture is then heated for an additional period of about 5 to 6 hours, as the temperature is gradually raised to about 300° C. During this period, the pressure is being lowered to about 1 mm Hg. The viscosity of the melt increases to a great extent, and the reaction is stopped while the polymer can still be forced from the reactor (e.g., an extruder) under gas pressure. The extruded material can then be pelletized.

As described previously, the transesterification reaction is preferably carried out as a continuous process. In preferred embodiments, the process utilizes at least one CSTR, operating under vacuum. This type of equipment is known in the art and described, for example, in the *Kirk-Othmer Encyclopedia of Chemical Technology*, 3rd Edition, Vol. 19, (1982.). Usually, the primary polycondensation reaction takes place in one CSTR under vacuum, or in a series of CSTR's operating under a sequential regimen of increasing temperature and decreasing pressure. These "oligomeric stages" remove about 65% to about 90% of theoretical phenol by-product. An additional catalyst such as one of the alkali metal or alkaline earth metal compounds may be added at this stage, (although sometimes, these types of compounds have already become incorporated into the reaction system during preparation of the oligomers.).

In some preferred embodiments, at least one additional, finishing reactor is added in series. This is often a plug flow reactor, which is particularly useful for treating high-viscosity melt materials. However, those skilled in chemical engineering understand that a wide variety of reactor configurations and designs are sometimes employed, and selection of a particular system depends on many factors, such as the specific types of reactants and catalysts employed; the volume of product being prepared; energy requirements; environmental parameters; the desired molecular weight of the polycarbonate product, and its viscosity.

As alluded to earlier, a primary aspect of this invention is based on the discovery that (1) the amount of effective catalyst is directly related to the amount of leaving group by-product produced in the transesterification reaction; and (2) determination of the by-product level can be utilized to discriminate between very small differences in the level of catalyst. These discoveries allow one to precisely determine the effective level of catalyst, i.e., the amount actually required to catalyze transesterification and yield a desired polycarbonate product, and to then control the catalyst level during the reaction.

The "leaving group by-product" is the by-product of the transesterification reaction (wherein polycarbonate is the principal product). Those of skill in the polymer arts understand that substantially all of the by-product is formed when a portion of the carbonic acid diester molecule is displaced during the reaction, becoming a leaving group. The exact structure of the leaving group will of course depend on the particular diester used. For example, use of an aliphatic diester would result in an aliphatic-type leaving group, e.g., an aliphatic alcohol. Use of an aromatic-type diester would result in an aromatic-type leaving group. As another illustration, use of diphenyl carbonate would result in the production of phenol as the by-product, while use of a diphenyl carbonate with substituents attached thereto, e.g., bis(chlorophenyl) carbonate, would result in a corresponding, substituted phenolic compound. For the sake of brevity, the leaving group by-product will sometimes be referred to herein as simply the "by-product", which should not be construed to include any reaction side-products which typically may be present at impurity levels.

In determining the effective level of catalyst, trial portions of an aromatic dihydroxy compound and a carbonic acid diester are first combined with a pre-determined, controlled amount of catalyst. The amount of material used for the trial portions is not critical. The dihydroxy compound and diester are those which would actually be employed to prepare the specific polycarbonate desired, e.g., the product being prepared on a commercial scale. The reaction may be carried out batch-wise or in a continuous process, with the latter being preferred. Any suitable reactor or combination of reactors may be employed, e.g., a CSTR or a plug flow apparatus. Reaction conditions such as pressure level are as described previously. The reaction temperature at this stage is maintained below the boiling point of the leaving group by-product. In the case of phenol, the temperature would be maintained below about 180° C., and preferably, in the range of about 150° C. to about 175° C. (This ensures that the by-product generated in the reaction primarily stays in the liquid melt, and can be quantitatively measured, as described below.) Usually, the residence time for the reaction is in the range of about 5 minutes to about 90 minutes, and preferably in the range of about 10 minutes to about 30 minutes.

As mentioned earlier, the reaction between the diester and the aromatic dihydroxy compound produces a leaving group (such as phenol) as the by-product. The melt, which includes the polycarbonate product, the leaving group by-product, and unreacted monomer and oligomers, is taken out of the reaction system in any type of exit stream. The level of by-product produced during the residence time is measured by any conventional off-line technique, such as liquid chromatography, or any on-line technique, such as a NIR (Near Infrared) spectroscopy system.

In preferred embodiments, a preparatory reaction or series of preparatory reactions or "calibration runs" is first undertaken, to establish the relationship between the level of leaving group by-product and the level of catalyst. This correlation can be designated as the "by-product reference value", which is the average amount of by-product produced when a selected level of transesterification catalyst (or catalysts) is used in the calibration runs. The by-product reference value is usually in the range of about 0.1 wt. % to about 5 wt. %, based on the weight of carbonic acid diester employed. Usually, the selected amount of catalyst is the amount that is required to produce polymer of the desired molecular weight in the reaction, or is some proportion of that amount. (As further illustrated below, there is a functional relationship between catalyst level and the amount of leaving group by-product, allowing one to calculate one of the values if the other value is known. In the case of diphenyl carbonate, for example, the relationship between catalyst level and phenol production is substantially linear). The calibration runs, which can be carried out with the trial portions of the components described above, provide the data (sometimes referred to herein as the "reaction values") suitable for establishing an accurate by-product reference value.

A hypothetical illustration for the situation in which the relationship between catalyst level and by-product production is substantially linear would be instructive. Thus, selected amounts of bisphenol A and diphenyl carbonate could be fed at an equimolar feed rate to the test reactor, at a constant temperature of about 160° C. The catalyst would be added at a variable rate, resulting in a catalyst concentration in the range of 10 to 100 units. The particular concentration will depend on the functional efficiency of the catalyst, and should cover the range at which the catalyst is known to produce a polycarbonate product of appropriate molecular weight by the polymerization process, i.e., a "target value" for the catalyst. For example, if the normal "loading" of the catalyst to make a desired product is 50 ppm, the catalyst feed could be varied to produce a catalyst concentration in the range of about 10 ppm to 100 ppm. The flow rates of the BPA and DPC could be controlled to result in a residence time of about 15 minutes. Then, the levels of the phenol by-product would be measured and plotted as a function of catalyst concentration. This will result in a substantially linear plot, having a slope "m", in units here of wt. % phenol/ppm catalyst.

The effective level of catalyst ("e") can then be calculated according to the equation $$e = c + (d/m) \quad (I),$$

where c is the pre-determined amount of catalyst added to the reactor, and d is the difference between the measured phenol level and the expected phenol level at that particular catalyst concentration (i.e., the reference value, as determined in the calibration runs). If the value of d is positive, the effective level of catalyst in the reaction mixture is higher than the amount introduced. If d is a negative value, the effective level of catalyst is lower than the amount introduced.

As a specific illustration, the value of c for a given reaction might be 50 ppm, while the difference d could be 1 wt. % (i.e., a measured phenol level of 5 wt. %, minus an expected phenol level of 4 wt. %). A further assumption is that the calculated slope m, based on calibration runs, is 1 wt %/1 ppm. Then, according to the above equation:

$e = c + (d/m)$, and thus, $e = 50$ ppm$+(1$ wt. %$/(1$ wt %$/1$ ppm$))=51$ ppm, the effective level of catalyst.

An analogous type of equation could be utilized for the situation in which the relationship between catalyst level and by-product production is functionally related, but not necessarily linear. Those of ordinary skill in the fundamentals of chemical kinetics would be able to derive such an equation without undue effort, based on data from the calibration runs discussed above.

Determination of the effective catalyst level is an important objective in the preparation of the polycarbonate polymer. The parameter can be used for analysis of the reaction kinetics of different transesterification catalysts, e.g., other catalysts whose efficiency may be affected by impurities specific to other processes in which the catalysts might be involved.

Moreover, the parameter can be used to control the catalyst level. Thus, another embodiment of this invention relates to a method for controlling the effective level of catalyst during preparation of a polycarbonate, e.g., in a large-scale melt process. As mentioned previously, the catalyst within the reaction system may be affected by a multitude of acidic or basic impurities which also become incorporated into the reaction. These impurities have been found to affect the reactive capability of any added catalyst— especially when the catalyst is being used at very low levels. The embodiment of the invention now being discussed addresses the effect of the impurities in the reaction "melt", and compensates for that effect, maximizing the chemical interaction between the primary reagents, i.e., the aromatic dihydroxy compound and the carbonic acid diester. Thus, the overall "reactivity" of the system is controlled.

The first step in controlling the effective level of catalyst is similar to that described previously, i.e., determining the effective level itself by monitoring the level of leaving group by-product. As mentioned above, the present inventors have discovered that there is a functional relationship between catalyst level and the level of leaving group by-product. As an example, the relationship may be linear or parabolic, and depends in large part on the nature of the reactants. In the case of diphenyl carbonate, the relationship is substantially linear. Thus, if the level of phenol decreases by a certain amount, the amount of catalyst being added to the reaction system should be increased by a proportionate amount. Conversely, if the level of phenol increases by a certain amount, the amount of catalyst being added to the reaction system should be decreased by a proportionate amount. (The example which follows provides a good illustration of such an adjustment.) The effective level of catalyst can be compared to the target value for the catalyst, i.e., the level at which the catalyst is known to produce a polycarbonate product of appropriate molecular weight by the specific polymerization process, as described previously.

To further illustrate with reference to the example provided above, the effective level of catalyst was determined there to be 51 ppm. An assumption will then be made that in the same reaction carried out in the past, e.g., on a large, production scale, the target value for the catalyst was 100 ppm. Thus, another 49 ppm of catalyst should be added to the reaction system to adjust the catalyst level and produce a grade of polycarbonate product with the desired qualities.

Moreover, the adjustment can be ongoing in a continuous process. In other words, after the by-product production level is adjusted to the rate (the by-product reference value) calculated to be most appropriate for the particular transesterification reaction taking place, the level of by-product can be continually monitored. Each time it moves above or below the reference value, a corresponding adjustment can be made in catalyst addition, to bring the level of leaving group by-product back into line with the reference value.

It should be apparent that another embodiment of the present invention is directed to an improved method for producing polycarbonate polymer by transesterification. The method comprises first determining the effective amount of transesterification catalyst appropriate for the reaction, as described previously. Then, at least one aromatic dihydroxy compound is reacted with at least one carbonic acid diester in a transesterification reaction process (e.g., a production-scale process) to prepare the polycarbonate, in the presence of an appropriate amount of a transesterification catalyst. (As used herein, "production-scale" is meant to include any scale above the laboratory scale—usually, at least about 50 kg of polycarbonate product per hour.). The appropriate amount of catalyst has been determined and controlled as explained above. The specific components used in the process have also been set forth previously. The product can be compounded and extruded into pellets by conventional, known techniques.

EXAMPLES

These examples are merely illustrative, and should not be construed to be any sort of limitation on the scope of the claimed invention.

Example 1

Diphenyl carbonate and bisphenol A were combined by being pumped through a test reactor, in the presence of a pre-determined amount of an alkali metal ion catalyst (NaOH). The flow rate of the DPC was 114.5 ml/hour, while the flow rate of the bisphenol A was 114.5 ml/hour. The test reactor was maintained at a temperature of 180° C. and a pressure of 1 atmosphere. The residence time for the components in the reactor was maintained at 30 minutes. The phenol level was measured and found to be at a base value of 5 wt. %.

During the course of the reaction, the phenol level dropped to 4 wt. %, i.e., a decrease of 20%. To compensate, an extra 20% of catalyst was added. This addition resulted in a rise in the level of phenol, returning to its base value.

It was observed that the decrease in phenol level had caused a fluctuation in the molecular weight of the final polycarbonate product. Such a fluctuation indicates that the material was outside of specification, i.e., it would not have the physical and/or chemical properties required for a particular end use. Addition of a selected amount of catalyst to control the effective level of catalyst according to this invention brought the molecular weight of the polymer product back into specification.

Example 2

In a computer simulation for a test reaction to prepare polycarbonate, the sensitivity of the phenol level to changes in the amount of catalyst was measured at regular intervals. (The kinetic data experimentally determined for an alkali metal ion catalyst were used in this simulation, employing substantially purified compounds similar to bisphenol A and diphenyl carbonate. The results were subsequently verified, using bisphenol A and diphenyl carbonate).

The readings shown correspond to a simulation of a CSTR with a 15-minute residence time, at five different temperature levels. The results are shown in Table 1:

TABLE 1

| Catalyst Level (%)* | Wt % Phenol (160° C.) | Wt % Phenol (165° C.) | Wt % Phenol (170° C.) | Wt % Phenol (175° C.) | Wt % Phenol (180° C.) |
|---|---|---|---|---|---|
| 5 | 0.0919331 | 0.1103752 | 0.1336735 | 0.1597055 | 0.1900077 |
| 15 | 0.2743313 | 0.3290158 | 0.3979324 | 0.4747099 | 0.563785 |
| 25 | 0.4547931 | 0.544862 | 0.6581045 | 0.783909 | 0.9294366 |
| 35 | 0.6333281 | 0.7579572 | 0.9143052 | 1.085708 | 1.287155 |
| 45 | 0.8099691 | 0.9683873 | 1.166559 | 1.383378 | 1.634884 |
| 55 | 0.9847643 | 1.176113 | 1.413659 | 1.675665 | 1.975196 |
| 65 | 1.157705 | 1.381342 | 1.65816 | 1.962755 | 2.305463 |
| 75 | 1.328858 | 1.583956 | 1.896824 | 2.239768 | 2.62747 |
| 85 | 1.498301 | 1.784064 | 2.130909 | 2.511839 | 2.942399 |
| 95 | 1.665927 | 1.981709 | 2.361362 | 2.777939 | 3.243685 |
| 100 | 1.749092 | 2.079632 | 2.476575 | 2.906653 | 3.391704 |

*Catalyst level relative to 100%, which is the approximate, maximum level of catalyst expected to be desirable for the particular reaction, based on the results of calibration reactions.

The data of Table 1 are also expressed in graph-form in FIG. 1. Based on the model, it's clear that the sensitivity of phenol production to catalyst level at higher temperatures is greater than at the lower temperatures, since the intervals between the values are greater as catalyst level increases. Thus, instrumentation for measuring the level of phenol need not be quite as sensitive at 180° C. than at 160° C. As mentioned above, the temperature is maintained below the approximate boiling point of the leaving group by-product.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

All of the patents, articles, and texts mentioned above are incorporated herein by reference.

We claim:

1. A method for determining the effective level of catalyst for the preparation of a polycarbonate polymer by a transesterification reaction between an aromatic dihydroxy compound and a carbonic acid diester which produces a leaving group by-product; comprising the following steps:

a) reacting trial portions of the aromatic dihydroxy compound and the carbonic acid diester at a temperature below the boiling point of the leaving group by-product, under melt conditions and in the presence of a known amount of a transesterification catalyst;

b) measuring the level of leaving group by-product; and c) calculating the effective level of catalyst, by inserting a set of reaction values into an equation representing the effective level of catalyst, wherein the equation is derived from at least one calibration reaction between the aromatic dihydroxy compound and the carbonic acid diester; and the reaction values comprise:

(i) the pre-determined amount of catalyst present in the reactor according to step (a); and (ii) the difference between the by-product level measured in step (b) and a by-product reference value pre-determined from the calibration reaction, wherein there is a functional relationship between the effective level of catalyst and the amount of leaving group by-product.

2. The method of claim 1, wherein the relationship between the effective level of catalyst and the amount of leaving group by-product is substantially linear, and the effective level of catalyst ("e") is calculated according to the equation $$e = c + (d/m) \quad \text{(I)},$$

where "c" is the predetermined amount of catalyst present in the reactor according to step (a); "d" is the difference between the by-product level measured in step (b) and a by-product reference value pre-determined from the calibration reaction; and "m" is the slope of a line representing by-product production as a function of catalyst concentration for the calibration reaction.

3. The method of claim 1, wherein the transesterification catalyst comprises an alkali metal salt of the aromatic dihydroxy compound.

4. The method of claim 3, wherein the alkali metal salt is a sodium salt.

5. The method of claim 1, wherein the transesterification catalyst is derived from a basic compound selected from the group consisting of sodium hydroxide, potassium hydroxide, and lithium hydroxide.

6. The method of claim 1, wherein the aromatic dihydroxy compound is bisphenol A.

7. The method of claim 1, wherein the carbonic acid diester is diphenyl carbonate, and the leaving group by-product comprises phenol.

8. The method of claim 2, wherein the predetermined by-product reference value represents the average amount of by-product produced in a multitude of the calibration reactions.

9. The method of claim 3, wherein the amount of transesterification catalyst employed in step (a) is in the range of about 1×10⁻⁸ mole to about 1 mole, based on 1 mole of the aromatic dihydroxy compound.

10. The method of claim 9, wherein the pre-determined by-product reference value for step (c) is in the range of about 0.1 wt. % to about 5 wt. %, based on the weight of carbonic acid diester present in step (a).

11. A method for controlling the effective level of catalyst during the preparation of a polycarbonate polymer by a transesterification reaction between an aromatic dihydroxy compound and a carbonic acid diester which produces a leaving group by-product; comprising the following steps:
   a) reacting trial portions of the aromatic dihydroxy compound and the carbonic acid diester at a temperature below the boiling point of the leaving group by-product, under melt conditions and in the presence of a known amount of a transesterification catalyst;
   b) measuring the level of by-product produced; and
   c) comparing the level of by-product produced to a by-product reference value which was pre-determined in at least one calibration reaction, wherein the level of by-product produced is substantially proportional to the effective level of catalyst; and
   d) adjusting the effective level of catalyst, based on the comparison of step (c).

12. A method for controlling the effective level of catalyst during the preparation of a polycarbonate polymer by a transesterification reaction between an aromatic dihydroxy compound and a carbonic acid diester which produces a leaving group by-product, comprising the following steps:
   a) reacting trial portions of the aromatic dihydroxy compound and the carbonic acid diester at a temperature below the boiling point of the leaving group by-product, under melt conditions and in the presence of a known amount of a transesterification catalyst;
   b) measuring the level of by-product produced; and
   c) calculating the effective level of catalyst, by inserting a set of reaction values into an equation representing the effective level of catalyst, wherein the equation is derived from at least one calibration reaction between the aromatic dihydroxy compound and the carbonic acid diester; and the reaction values comprise:
      (i) the pre-determined amount of catalyst present in the reactor according to step (a);
      (ii) the difference between the by-product level measured in step (b); and a by-product reference value pre-determined from the calibration reaction; and then
   d) adjusting the amount of catalyst utilized in a production-scale transesterification reaction process to prepare polycarbonate, based on the comparison of the level of by-product produced in step (b) with the effective level of catalyst determined in step (c),
   wherein there is a functional relationship between the effective level of catalyst and the amount of leaving group by-product.

13. The method of claim 12, wherein the relationship between the effective level of catalyst and the amount of leaving group by-product is substantially linear, and the effective level of catalyst ("e") is calculated according to the equation $$e = c + (d/m) \tag{I}$$

where "c" is the predetermined amount of catalyst present in the reactor according to step (a); "d" is the difference between the by-product level measured in step (b) and a by-product reference value pre-determined from the calibration reaction; and "m" is the slope of a line representing by-product production as a function of catalyst concentration for the calibration reaction.

14. The method of claim 13, wherein the transesterification catalyst comprises an alkali metal salt of the aromatic dihydroxy compound.

15. The method of claim 14, wherein the alkali metal salt is a sodium salt.

16. The method of claim 12, wherein the level of by-product produced in step (b) is greater than the pre-determined by-product reference value, and the adjustment of step (d) comprises reducing the catalyst amount to a level sufficient to lower the by-product production to the pre-determined reference value.

17. The method of claim 12, wherein the level of by-product produced in step (b) is less than the predetermined by-product reference value, and the adjustment of step (d) comprises increasing the catalyst amount to a level sufficient to raise the by-product production to the predetermined reference value.

18. The method of claim 12, wherein the leaving group by-product is phenol.

19. An improved method for producing polycarbonate polymer by a production-scale transesterification reaction between at least one aromatic dihydroxy compound and at least one carbonic acid diester which produces a leaving group by-product; comprising the following steps:
   (i) reacting trial portions of the aromatic dihydroxy compound and the carbonic acid diester at a reaction temperature less than the boiling point of the leaving group by-product, under melt conditions and in the presence of a known amount of a transesterification catalyst;
   (ii) measuring the level of by-product produced;
   (iii) calculating the effective level of catalyst for step (i); and
   (iv) reacting additional aromatic dihydroxy compound and carbonic acid diester in a production-scale transesterification reaction process to prepare polycarbonate, in the presence of an appropriate amount of a transesterification catalyst,
   wherein the appropriate amount of transesterification catalyst for the production-scale process is determined by the effective level of catalyst determined in step (iii).

20. The method of claim 19, wherein the transesterification catalyst comprises an alkali metal salt of the aromatic dihydroxy compound.

21. The method of claim 19, wherein the transesterification catalyst is used in conjunction with a second transesterification catalyst.

22. The method of claim 19, wherein the leaving group by-product is phenol.

* * * * *